(12) United States Patent
Divrikli et al.

(10) Patent No.: US 12,168,454 B2
(45) Date of Patent: Dec. 17, 2024

(54) METHOD AND DEVICE FOR PREDICTING A FUTURE ACTION OF AN OBJECT FOR A DRIVING ASSISTANCE SYSTEM FOR VEHICLE DRIVABLE IN HIGHLY AUTOMATED FASHION

(71) Applicant: Robert Bosch GmbH, Stuttgart (DE)

(72) Inventors: Evren Divrikli, Neckarwestheim (DE); Federico Ignacio Sanchez Pinzon, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 286 days.

(21) Appl. No.: 17/854,993

(22) Filed: Jun. 30, 2022

(65) Prior Publication Data
US 2023/0012378 A1    Jan. 12, 2023

(30) Foreign Application Priority Data
Jul. 8, 2021    (DE) ...................... 10 2021 207 234.8

(51) Int. Cl.
*B60W 60/00*    (2020.01)
*B60W 40/04*    (2006.01)
*B60W 50/00*    (2006.01)

(52) U.S. Cl.
CPC ........ *B60W 60/0011* (2020.02); *B60W 40/04* (2013.01); *B60W 50/0097* (2013.01); *B60W 60/00274* (2020.02); *B60W 2050/0052* (2013.01); *B60W 2420/403* (2013.01); *B60W 2420/408* (2024.01); *B60W 2420/54* (2013.01); *B60W 2554/4041* (2020.02); *B60W 2556/35* (2020.02)

(58) Field of Classification Search
CPC ....... B60W 60/0011; B60W 60/00274; B60W 40/04; B60W 50/0097; B60W 2554/4041; B60W 2556/35; B60W 2420/408; B60W 2050/0052; B60W 2420/403; B60W 2420/54

See application file for complete search history.

(56) References Cited

U.S. PATENT DOCUMENTS

2020/0338983 A1* 10/2020 Alalao ................... B60K 35/00

* cited by examiner

*Primary Examiner* — Michael D Lang
(74) *Attorney, Agent, or Firm* — NORTON ROSE FULBRIGHT US LLP; Gerard A. Messina

(57) ABSTRACT

A method for predicting a future action of an object for a driving assistance system for a highly automated mobile vehicle. At least one sensor signal from at least one vehicle sensor of the vehicle is read in, the sensor signal representing at least one piece of kinematic object information concerning the object that is detected by the vehicle sensor at an instantaneous point in time. A planner signal from a planner of the autonomous driving assistance system is read in, the planner signal representing at least one piece of semantic information concerning the object or the surroundings of the object at a point in time in the past. The kinematic object information is fused with the semantic information to obtain a fusion signal. A prediction signal is determined using the fusion signal, the prediction signal representing the future action of the object.

16 Claims, 2 Drawing Sheets

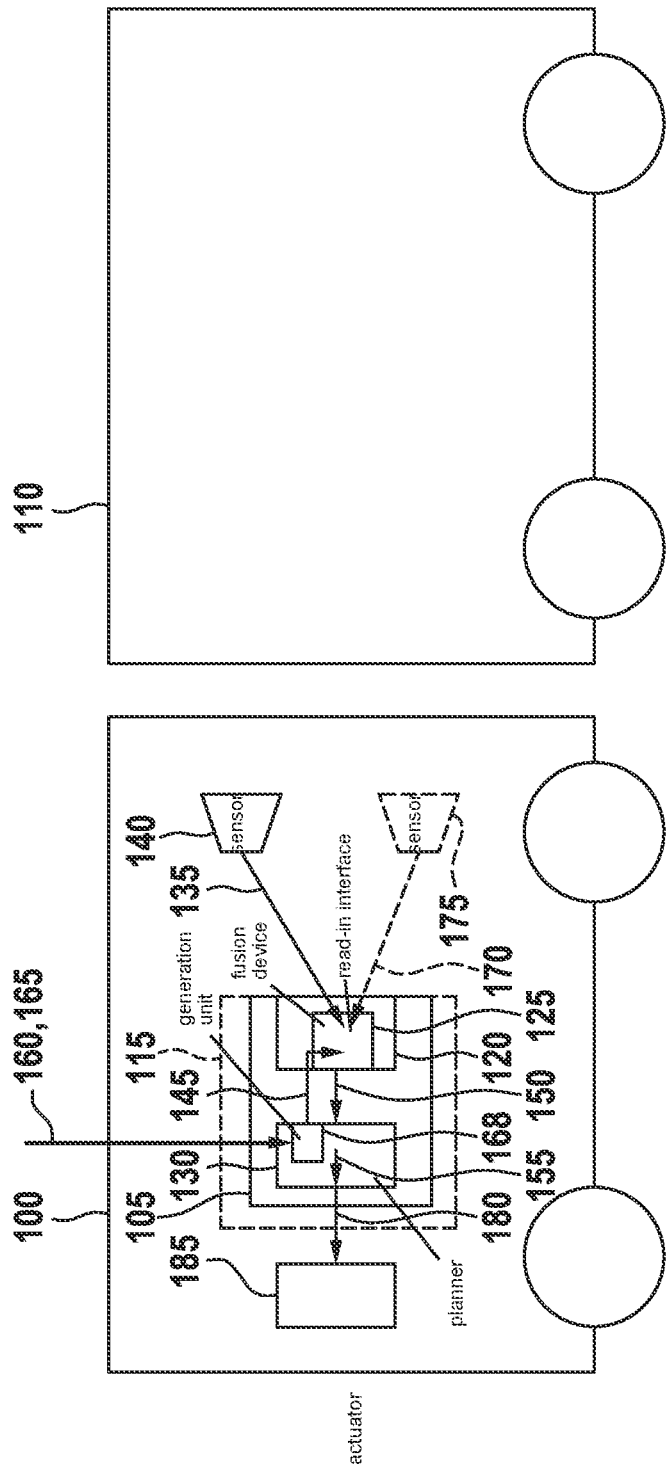

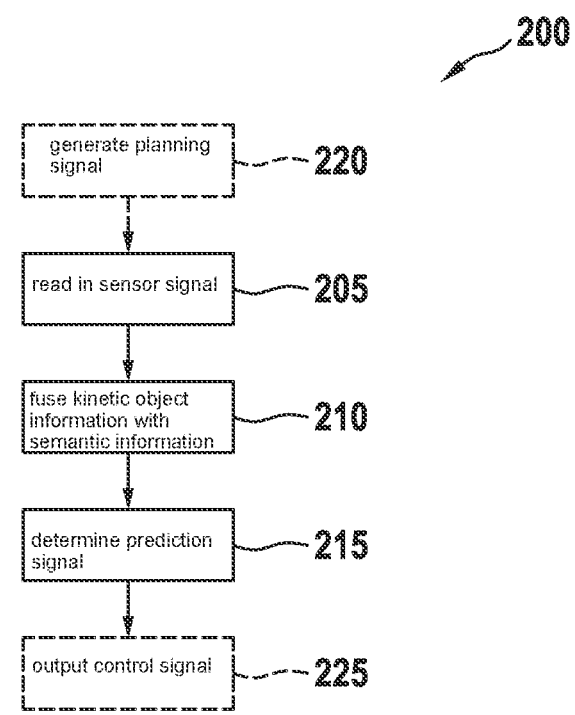

METHOD AND DEVICE FOR PREDICTING A FUTURE ACTION OF AN OBJECT FOR A DRIVING ASSISTANCE SYSTEM FOR VEHICLE DRIVABLE IN HIGHLY AUTOMATED FASHION

FIELD

The present invention is directed to a device or a method for predicting an future action of an object for a driving assistance system. Moreover, the present invention relates to a computer program.

BACKGROUND INFORMATION

Nowadays, autonomous driver systems are built up very similarly to a pipeline of processes, beginning with the sensors, then a fusion of sensors. The fused object list is then supplied to the planner, and ends with the actuators.

SUMMARY

The present invention provides a method for predicting a future action of an object for a driving assistance system for a highly automated mobile vehicle, as well as a device that uses this method, and a corresponding computer program. Advantageous refinements and enhancements of the present invention are disclosed herein.

Advantages that are achievable using the provided approach include that, with a data fusion, particularly accurate results are generated in order to allow a more exact statement about a prediction of an action of an object.

According to an example embodiment of the present invention, a method for predicting a future action of an object for a driving assistance system for a highly automated mobile vehicle is provided. The method includes a step of reading in, a step of fusing, and a step of determining. In the step of reading in, at least one sensor signal from at least one vehicle sensor of the vehicle is read in, the sensor signal representing at least one piece of kinematic object information concerning the object that is detected by the vehicle sensor at an instantaneous point in time, and a planner signal from a planner of the autonomous driving assistance system is read in, the planner signal representing at least one piece of semantic information concerning the object or the surroundings of the object at a point in time in the past. In the step of fusing, the kinematic object information is fused with the semantic information to obtain a fusion signal that represents a piece of fused information concerning the object. In the step of determining, a prediction signal is determined using the fusion signal, the prediction signal representing the future action of the object.

This method may be implemented, for example, in software or hardware or in a mixed form made up of software and hardware, for example in a control unit.

The object may be a person or a thing, for example, another vehicle, which is tracked after detection. The planner is designed to make a prediction concerning what other objects/vehicles in traffic intend to do, and then plans what the ego-vehicle is to do. The semantic information may be a piece of information concerning the object or surroundings of the object which describes a present context. For example, such a piece of semantic information may indicate an end of a lane ahead of the other vehicle, via which it may be predicted that the driver of the other vehicle is very likely to make a lane change. In addition, pieces of semantic information such as an activated blinker of the other vehicle may be used to predict a turn by the other vehicle, or a recognized brake light of the other vehicle may predict an imminent braking maneuver of the other vehicle. The semantic information may be provided and/or read in by a stack memory/stack register of the driving assistance system or planner. Since in the method provided here, not only pieces of kinematic object information from vehicle sensors, but also pieces of semantic information that originate from the downstream planner, are returned for the fusion, the prediction may advantageously be more accurate.

In the step of fusing, an alpha-beta filter, in particular a Kalman filter or a derivation of the Kalman filter, may be used to obtain the fusion signal. Such an alpha-beta filter, also referred to as a "g-h filter," is suited for carrying out the data/information fusion.

According to one specific example embodiment of the present invention, the method may also include a step of generating, in which the planner signal is generated, at least in part, from a temporally preceding fusion signal.

In the step of reading in, at least one further sensor signal may be read in from a further vehicle sensor of the vehicle, the further sensor signal representing at least one further piece of kinematic object information concerning the object that is detected by the further vehicle sensor, or a further object that is detected by the further vehicle sensor, in the step of fusing, the further piece of kinematic object information also being fused to obtain the fusion signal. Thus, sensor data from multiple vehicle sensors may be fused. The more data that are fused from different vehicle sensors, the more accurately the object may be tracked and the prediction may be made.

According to one specific example embodiment of the present invention, a duplication of pieces of kinematic object information may be suppressed in the step of fusing. This may prevent an unnecessarily large number of pieces of information, for example duplicate pieces of information, being present which may influence the speed of the data processing.

The steps of the method may be carried out multiple times to determine the particular obtained prediction signals, based on recursive planning. The accuracy of the prediction may thus be further increased.

It is also advantageous when, according to one specific example embodiment of the present invention, the method includes a step of outputting, in which a control signal for activating an actuator of the vehicle is output, using the prediction signal. The vehicle may thus be automatedly controlled, based on the prediction. In one specific embodiment, the actuator may be a braking system of the vehicle. For example, the vehicle may thus be braked via the control signal when a prediction signal has been determined that likewise indicates a braking operation of the object in order to increase driving safety.

In the step of reading in, the sensor signal may be read in by the vehicle sensor, which is formed as a camera, a radar system, in particular a LIDAR system, or an ultrasound system. These types of vehicle sensors allow the pieces of kinematic object information to be provided. Similarly, in the step of reading in, the further sensor signal from the further vehicle sensor may also be read in, the further vehicle sensor being formed as a further camera, a further radar system, in particular a further LIDAR system, or a further ultrasound system.

According to one specific example embodiment of the present invention, the sensor signal, which as the kinematic object information includes a position, speeds, acceleration, orientation, and/or size of the object or vehicle, may be read in in the step of reading in. Similarly, in the step of reading in, the further sensor signal, which as the further piece of kinematic object information includes a further position, further speeds, further acceleration, further orientation, and/or further size of the object or vehicle, may be read in. These types of pieces of kinematic object information allow the prediction of a future action of the object.

It is also advantageous when, according to one specific example embodiment of the present invention, in the step of reading in, the semantic information of the planner signal is transformed into a piece of kinematic information, in the step of fusing, the kinematic object information being fused with the kinematic information to obtain the fusion signal. The fusion may thus be technically facilitated. A transformation thus carried out into kinematics may be, for example, that a recognized left blinker is converted into an acceleration to the left, so that it is predicted that in the future, the vehicle will briefly move to the left and will not maintain the straight trajectory.

Moreover, the present invention provides a device that is designed to carry out, control, or implement the steps of one variant of a method provided here in appropriate units. By use of this embodiment variant of the approach in the form of a device, the object underlying the present invention may also be achieved quickly and efficiently.

For this purpose, according to an example embodiment of the present invention, the device may include at least one processing unit for processing signals or data, at least one memory unit for storing signals or data, and at least one interface to a sensor or an actuator for reading in sensor signals from the sensor or for outputting data signals or control signals to the actuator, and/or at least one communication interface for reading in or outputting data that are embedded in a communication protocol. The processing unit may be, for example, a signal processor, a microcontroller, or the like, it being possible for the memory unit to be a flash memory, an EEPROM, or a magnetic memory unit. The communication interface may be designed for reading in or outputting data wirelessly and/or in a hard-wired manner, it being possible for a communication interface, which may read in or output the hard-wired data, to read in these data electrically or optically, for example, from a corresponding data transmission line, or to output these data into a corresponding data transmission line.

In the present context, a device may be understood to mean an electrical device that processes sensor signals and outputs control and/or data signals as a function thereof. The device may include an interface that may have a hardware and/or software design. In a hardware design, the interfaces may be part of a so-called system ASIC, for example, which contains various functions of the device. However, it is also possible for the interfaces to be dedicated, integrated circuits, or to be at least partially made up of discrete components. In a software design, the interfaces may be software modules that are present, for example, on a microcontroller in addition to other software modules.

Moreover, according to an example embodiment of the present invention, a driving assistance system for a highly automated mobile vehicle is provided, the driving assistance system including the device described above. Such a driving assistance system may be used for highly automated control of the vehicle and may achieve the advantages described above.

Also advantageous, according to an example embodiment of the present invention, is a computer program product or computer program including program code that may be stored on a machine-readable medium or memory medium such as a semiconductor memory, a hard disk, or an optical memory, and used for carrying out, implementing, and/or controlling the steps of the method according to one of the specific example embodiments described above, in particular when the program product or program is executed on a computer or a device.

Exemplary embodiments of the present invention presented here are illustrated in the figures and explained in greater detail in the following description.

BRIEF DESCRIPTION OF THE DRAWINGS

FIG. 1 shows a schematic illustration of a vehicle including a device according to one exemplary embodiment of the present invention for predicting a future action of an object.

FIG. 2 shows a flowchart of a method according to one exemplary embodiment of the present invention for predicting a future action of an object for a driving assistance system for a highly automated mobile vehicle.

DETAILED DESCRIPTION OF EXAMPLE EMBODIMENTS

In the following description of advantageous exemplary embodiments of the present approach, identical or similar reference numerals are used for the elements having a similar action which are illustrated in the various figures, and a repeated description of these elements is dispensed with.

FIG. 1 shows a schematic illustration of a vehicle 100 that includes a device 105 according to one exemplary embodiment for predicting a future action of an object 110.

Strictly as an example, according to this exemplary embodiment, device 105 is implemented in a driving assistance system 115 of vehicle 100, which according to this exemplary embodiment is formed as a highly automated mobile vehicle 100 strictly as an example.

Device 100 includes at least one read-in interface 120, a fusion device 125, and a planner 130. Read-in interface 120 is designed to read in at least one sensor signal 135 from at least one vehicle sensor 140 of vehicle 100, sensor signal 135 representing at least one piece of kinematic object information concerning object 110 that is detected by vehicle sensor 140 at an instantaneous point in time. Read-in interface 120 is also designed to read in a planner signal 145 from planner 130 of autonomous driving assistance system 110, planner signal 145 representing at least one piece of semantic information concerning object 110 or the surroundings of object 110 at a point in time in the past. Fusion device 125 is designed to fuse the kinematic object information with the semantic information to obtain a fusion signal 150 that represents a piece of fused information concerning object 110. Planner 130 is designed to determine a prediction signal 155 using fusion signal 150, prediction signal 155 representing the future action of object 110.

According to this exemplary embodiment, object 110 is another vehicle, which according to this exemplary embodiment is traveling ahead of vehicle 100. According to one alternative exemplary embodiment, object 110 is some other thing or a person. According to this exemplary embodiment, vehicle sensor 140, fusion device 125, and planner 130 are successively connected in sequence in terms of their functional operation, except that planner signal 145 from planner 130 is fed back to fusion device 125. According to this exemplary embodiment, the semantic information is a piece of information concerning object 110 or surroundings of object 110 that describe(s) a context that is present. According to different exemplary embodiments, the semantic information is read in as a semantic signal 160 via planner 130 by a vehicle-internal or vehicle-external situation recognition unit. According to one alternative exemplary embodiment, planner 130 is additionally or alternatively designed to determine the semantic information itself, using surroundings signals 165. According to one exemplary embodiment, the semantic information is provided by a stack memory of driving assistance system 115 or planner 130. According to this exemplary embodiment, planner 130 also includes a generation unit 168 that is designed to generate planner signal 145, at least in part, from a temporally preceding fusion signal. Device 105 provided here is thus designed not only to fuse pieces of kinematic object information from vehicle sensors 140, but also to return pieces of semantic information for the fusion, which originate from planner 130 downstream from fusion device 125, to fusion device 125 in order to made a particularly accurate prediction about the future action of an object 110.

According to this exemplary embodiment, read-in interface 120 is designed to also read in at least one further sensor signal 170 from a further vehicle sensor 175 of vehicle 100, further sensor signal 175 representing at least one further piece of kinematic object information concerning object 110 that is detected by further vehicle sensor 175, or a further object that is detected by further vehicle sensor 175, fusion device 125 also fusing the further piece of kinematic object information to obtain fusion signal 150. Similarly, an arbitrary number of additional sensor signals from an arbitrary number of additional vehicle sensors may also be read in and fused to form fusion signal 150. According to this exemplary embodiment, read-in interface 120 is designed to read in sensor signal 135 from vehicle sensor 140 and/or to read in further sensor signal 170 from further vehicle sensor 175, which according to this exemplary embodiment is formed as a camera, a radar system, in particular a LIDAR system, or an ultrasound system. According to this exemplary embodiment, read-in interface 120 is designed to read in sensor signal 135 and/or further sensor signal 170, which includes a position, speeds, acceleration, orientation, and/or size of object 110 or vehicle 100 as the kinematic object information. According to this exemplary embodiment, read-in unit interface 120 or fusion device 125 is designed to transform the semantic information of planner signal 145 into a piece of kinematic information, fusion device 125 being designed to fuse the kinematic object information and/or a further piece of kinematic object information with the kinematic information during the fusion to obtain fusion signal 150.

According to this exemplary embodiment, fusion device 125 is designed to use an alpha-beta filter, in particular a Kalman filter or a derivation of the Kalman filter, to obtain fusion signal 150. According to this exemplary embodiment, fusion device 125 is designed to suppress duplication of pieces of kinematic object information.

According to this exemplary embodiment, planner 130 is designed to output a control signal 180 for activating an actuator 185 of vehicle 100, using prediction signal 155. According to this exemplary embodiment, actuator 185 is a braking system of vehicle 100. According to one exemplary embodiment, for example vehicle 100 is braked via control signal 180 when a prediction signal 155 has been determined that indicates a braking operation of object 110, in order to increase driving safety.

Device 105 provided here advantageously allows planner-to-fusion feedback for a better prediction for the sensor fusion for driving assistance systems 115, which may also be referred to as autonomous driving systems or autonomous driver systems. Nowadays, autonomous driver systems, AD systems for short, are built up very similarly to a pipeline of processes, beginning with sensors 140, 175 such as a camera, radar, LIDAR, and/or ultrasound, etc., then a fusion of sensors 140, 175; the fused object list is supplied to planner 130, and ends with actuators 185. During the sensor fusion, with the aid of fusion device 125, streams of detected objects are combined with appropriate pieces of information such as position, speeds, accelerations, orientation, and/or size, etc., from the various sensors 140, 175, the duplication of pieces of information being avoided. In this way a stream of objects 110 that have been "seen" or sensed by all sensors 140, 175 is generated without resulting in duplicates, due to the fact that a large number of sensors 140, 175 "see" same object 110.

To assist with the task of the so-called tracking of objects 110, a type of g-h filter is used, which according to this exemplary embodiment is typically an implementation of the Kalman filter or a derivation of same. Internally, fusion/fusion device 125 keeps track of objects 110 using pieces of kinematic object information. Every time that a new measured object arrives from a sensor 140, 175, the tracked objects 110 are "predicted" onto the time stamp, for which the new information is received. This is possible because the most recent position and the speeds and/or accelerations are known. This is a critical step in the Kalman filter or any other g-h filter. The quality of this prediction determines the likelihood that newly arriving objects are correctly assigned to tracked object 110 that is present.

Device 105 provided here now advantageously allows, in addition to the kinematic/pieces of kinetic information from input sensors 140, 175, feedback or pieces of semantic information from planner 130 to enter into fusion/fusion device 125 to assist with the prediction of tracked objects 110. In particular, according to this exemplary embodiment, feedback takes place from other blocks of the AD system stack/stack memory/stack register, which assist with such a prediction.

Planner 130 deals with the prediction of what objects 110 such as other vehicles are planning to do in traffic, in that according to this exemplary embodiment, the planner typically carries out recursive planning, and then plans what ego-vehicle 100 is to do. This prediction of planner 130 is fundamentally different from that used in the fusion, since it typically uses not pieces of kinetic information, but, rather, other pieces of semantic information that may be available. For example, if a lane is ending ahead of the other vehicle, it is predictable that the driver of the other vehicle will very likely make a lane change. In addition, pieces of information such as blinkers or a brake light or a braking maneuver may be used to predict a turn. These important available pieces of semantic information are now used by fusion device 125 for device 105 that is provided here in order to make better predictions in the fusion process.

A feedback loop from planner 130 into fusion system 125 is thus implemented in which all pieces of information that are relevant for the prediction are returned into the fusion. These pieces of information, after a possible transformation into kinematics, are used in the prediction steps in the internal filter of the tracker. The transformation into kinematics may be, for example, that a left blinker is converted into an acceleration to the left, so that it is predicted that in the future, other vehicle 110 will briefly move to the left and will not maintain the straight trajectory.

In summary, in the approach provided here, in autonomous driving system 115 a feedback loop from planner 130 into the sensor fusion system, referred to above as fusion device 125, is implemented in which all pieces of information that are relevant for the prediction are returned to the sensor fusion. These pieces of information, after a possible conversion into kinematics, are used in the prediction steps in the internal filter of the tracker that tracks objects 110. Information is sent not from fusion 125 into sensors 140, 175, but, rather, from planner 130 into fusion 125, so that the prediction in fusion 125 may deliver better results.

FIG. 2 shows a flowchart of a method 200 according to one exemplary embodiment for predicting a future action of an object for a driving assistance system for a highly automated mobile vehicle. This may be a method 200 that may be carried out and/or controlled by the device described with reference to FIG. 1.

Method 200 includes a step 205 of reading in, a step 210 of fusing, and a step 215 of determining. In step 205 of reading in, at least one sensor signal from at least one vehicle sensor of the vehicle is read in, the sensor signal representing at least one piece of kinematic object information concerning the object that is detected by the vehicle sensor at an instantaneous point in time, and a planner signal from a planner of the autonomous driving assistance system is read in, the planner signal representing at least one piece of semantic information concerning the object or the surroundings of the object at a point in time in the past. The kinematic object information is fused with the semantic information in step 210 of fusing to obtain a fusion signal that represents a piece of fused information concerning the object. A prediction signal is determined in step 215 of determining, using the fusion signal, the prediction signal representing the future action of the object.

According to this exemplary embodiment, method 200 optionally also includes a step 220 of generating and/or a step 225 of outputting. The planner signal is generated, at least in part, from a temporally preceding fusion signal in step 220 of generating. A control signal for activating an actuator of the vehicle is output in step 225 of outputting, using the prediction signal.

According to one exemplary embodiment, steps 205, 210, 215, 220, 225 of method 200 are carried out multiple times in order to determine the particular obtained prediction signals, based on recursive planning.

The method steps provided here may be carried out repeatedly, as well as in an order other than that described.

An exemplary embodiment which includes an "and/or" linkage between a first feature and a second feature may be construed in such a way that according to one specific embodiment, the exemplary embodiment includes the first feature as well as the second feature, and according to another specific embodiment includes only the first feature or only the second feature.

What is claimed is:

1. A method for predicting a future action of an object for an autonomous driving assistance system for a highly automated mobile vehicle, the method comprising the following steps:
   reading in: (i) at least one sensor signal from at least one vehicle sensor of the vehicle, the sensor signal representing at least one piece of kinematic object information concerning an object that is detected by the vehicle sensor at an instantaneous point in time, and (ii) a planner signal from a planner of the autonomous driving assistance system, the planner signal representing at least one piece of semantic information concerning the object or surroundings of the object at a point in time in the past prior to the instantaneous point in time;
   fusing the kinematic object information with the semantic information to obtain a fusion signal that represents a piece of fused information concerning the object, wherein in the reading in step, prior to the fusing, the semantic information of the planner signal is transformed into a piece of kinetic information of the object, and wherein the fusing includes fusing the kinetic object information with the piece of kinetic information of the object; and
   determining a prediction signal using the fusion signal, the prediction signal representing the future action of the object.

2. The method as recited in claim 1, wherein in the step of fusing, a Kalman filter or a derivation of the Kalman filter, is used to obtain the fusion signal.

3. The method as recited in claim 1, further comprising the following step:
   generating, in which the planner signal is generated, at least in part, from a temporally preceding fusion signal.

4. The method as recited in claim 1, wherein in the step of reading in, at least one further sensor signal is read in from a further vehicle sensor of the vehicle, the further sensor signal representing at least one further piece of kinematic object information concerning: (i) the object that is detected by the further vehicle sensor, or (ii) a further object that is detected by the further vehicle sensor, and wherein, in the step of fusing, the further piece of kinematic object information is also fused to obtain the fusion signal).

5. The method as recited in claim 1, wherein a duplication of pieces of kinematic object information is suppressed in the step of fusing.

6. The method as recited in claim 1, wherein the steps of the method are carried out multiple times to determine obtained prediction signals, based on recursive planning.

7. The method as recited in claim 1, further comprising:
   outputting, in which a control signal for activating an actuator of the vehicle is output, using the prediction signal.

8. The method as recited in claim 1, wherein in the step of reading in, the sensor signal is read in by the vehicle sensor, the vehicle sensor including a camera or a radar system or a LIDAR system or an ultrasound system.

9. The method as recited in claim 1, wherein the sensor signal, which as the kinematic object information includes a position of the object and/or a speed of the object and/or an acceleration of the object and/or an orientation of the object and/or size of the object, is read in in the step of reading in.

10. The method according to claim 1, wherein the piece of kinetic information of the object into which the semantic information is transformed is an acceleration of the object.

11. A device configured to predict a future action of an object for an autonomous driving assistance system for a highly automated mobile vehicle, the device configured to:
    read in: (i) at least one sensor signal from at least one vehicle sensor of the vehicle, the sensor signal representing at least one piece of kinematic object information concerning an object that is detected by the vehicle sensor at an instantaneous point in time, and (ii) a planner signal from a planner of the autonomous driving assistance system, the planner signal representing at least one piece of semantic information concerning the object or surroundings of the object at a point in time in the past prior to the instantaneous point in time;
    fuse the kinematic object information with the semantic information to obtain a fusion signal that represents a piece of fused information concerning the object, wherein in the reading in, prior to the fusing, the semantic information of the planner signal is transformed into a piece of kinetic information of the object, and wherein the fusing includes fusing the kinetic object information with the piece of kinetic information of the object; and determine a prediction signal using the fusion signal, the prediction signal representing the future action of the object.

12. The device according to claim 11, wherein the piece of kinetic information of the object into which the semantic information is transformed is an acceleration of the object.

13. A driving assistance system for a highly automated mobile vehicle, the driving assistance system comprising:

a device configured to predict a future action of an object for an autonomous driving assistance system for the highly automated mobile vehicle, the device configured to:

read in: (i) at least one sensor signal from at least one vehicle sensor of the vehicle, the sensor signal representing at least one piece of kinematic object information concerning an object that is detected by the vehicle sensor at an instantaneous point in time, and (ii) a planner signal from a planner of the autonomous driving assistance system, the planner signal representing at least one piece of semantic information concerning the object or surroundings of the object at a point in time in the past prior to the instantaneous point in time;

fuse the kinematic object information with the semantic information to obtain a fusion signal that represents a piece of fused information concerning the object, wherein in the reading in, prior to the fusing, the semantic information of the planner signal is transformed into a piece of kinetic information of the object, and wherein the fusing includes fusing the kinetic object information with the piece of kinetic information of the object; and determine a prediction signal using the fusion signal, the prediction signal representing the future action of the object.

14. The driving assistance system according to claim 13, wherein the piece of kinetic information of the object into which the semantic information is transformed is an acceleration of the object.

15. A non-transitory computer-readable medium on which is stored a computer program for predicting a future action of an object for an autonomous driving assistance system for a highly automated mobile vehicle, the computer program, when executed by a computer, causing the computer to perform the following steps:

reading in: (i) at least one sensor signal from at least one vehicle sensor of the vehicle, the sensor signal representing at least one piece of kinematic object information concerning an object that is detected by the vehicle sensor at an instantaneous point in time, and (ii) a planner signal from a planner of the autonomous driving assistance system, the planner signal representing at least one piece of semantic information concerning the object or surroundings of the object at a point in time in the past prior to the instantaneous point in time;

fusing the kinematic object information with the semantic information to obtain a fusion signal that represents a piece of fused information concerning the object; and determining a prediction signal using the fusion signal, the prediction signal representing the future action of the object, wherein in the reading in step, prior to the fusing, the semantic information of the planner signal is transformed into a piece of kinetic information of the object, and wherein the fusing includes fusing the kinetic object information with the piece of kinetic information of the object.

16. The non-transitory computer-readable medium according to claim 15, wherein the piece of kinetic information of the object into which the semantic information is transformed is an acceleration of the object.

* * * * *